United States Patent
Ramesh

Patent Number: 6,151,484
Date of Patent: Nov. 21, 2000

[54] COMMUNICATIONS APPARATUS AND METHODS FOR ADAPTIVE SIGNAL PROCESSING BASED ON MOBILITY CHARACTERISTICS

[75] Inventor: Rajaram Ramesh, Cary, N.C.

[73] Assignee: Ericsson Inc., Research Triangle Park, N.C.

[21] Appl. No.: 08/908,088

[22] Filed: Aug. 8, 1997

[51] Int. Cl.[7] ............................................. H04Q 7/20
[52] U.S. Cl. .......................... 455/68; 455/517; 375/232; 375/346
[58] Field of Search ................... 455/432, 433, 455/440, 447, 517, 524, 525, 552, 553, 441, 68; 375/346, 347, 348, 349, 350, 351, 232, 233, 234, 235, 236

[56] References Cited

U.S. PATENT DOCUMENTS

| | | | |
|---|---|---|---|
| 5,285,480 | 2/1994 | Chennakeshu et al. | 375/101 |
| 5,428,815 | 6/1995 | Grube | 455/447 |
| 5,640,686 | 6/1997 | Norimatsu | 455/552 |
| 5,729,558 | 3/1998 | Mobin | 375/232 |
| 5,732,359 | 3/1998 | Baranowsky, II et al. | 455/437 |
| 5,732,360 | 3/1998 | Jarett et al. | 455/432 |
| 5,761,623 | 6/1998 | Lupien et al. | 455/439 |
| 5,884,189 | 3/1999 | Yamazaki et al. | 455/522 |
| 5,887,260 | 3/1999 | Nakata | 455/552 |
| 5,903,596 | 5/1999 | Nakano | 375/347 |
| 5,946,634 | 8/1999 | Korpela | 455/552 |
| 6,028,901 | 2/2000 | Huynh et al. | 375/350 |

FOREIGN PATENT DOCUMENTS

| | | |
|---|---|---|
| 0 434 651 A1 | 6/1991 | European Pat. Off. . |
| 0 496 677 A2 | 7/1992 | European Pat. Off. . |
| 0 593 186 A1 | 4/1994 | European Pat. Off. . |

OTHER PUBLICATIONS

Li et al., "An Adaptive Filtering Technique for Pilot Aided Transmission Systems," Vehicular Technology Conference, Orlando, May 6–9, 1990, no. CONF. 40, May 6, 1990, pp. 507–512, IEEE.

International Search Report, PCT/US98/16503, Mar. 26, 1999.

*Primary Examiner*—Edward F. Urban
*Attorney, Agent, or Firm*—Myers Bigel Sibley & Sajovec

[57] ABSTRACT

Information represented by a signal generated in a communications medium by a first entity is recovered by receiving the signal from the communications medium at a second entity, determining a mobility characteristic for communications between the first entity and the second entity, and adaptively estimating the information from the received signal based on the determined mobility characteristic. The mobility characteristic may be received from the first entity at the second entity, and the information represented by the received signal may be adaptively estimated based on the received mobility characteristic. According to an embodiment of the invention, the mobility characteristic is a cell type identifier which is communicated from a base station to a mobile terminal, the mobile terminal adaptively estimating information from a signal received from the base station based on the communicated cell type identifier. A number of signal processing functions may be adaptively performed, including adaptive demodulation, adaptive channel estimation/interpolation, adaptive equalization, adaptive channel tracking, and adaptive combining of received signals.

37 Claims, 7 Drawing Sheets

COMMUNICATIONS APPARATUS AND METHODS FOR ADAPTIVE SIGNAL PROCESSING BASED ON MOBILITY CHARACTERISTICS

FIELD OF THE INVENTION

The present invention relates to communications systems and methods, in particular, to systems and methods for recovering information from signals generated in a communications medium.

BACKGROUND OF THE INVENTION

Radiotelephone systems are commonly employed to provide voice and data communications to a plurality of mobile units or subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Figure 1:
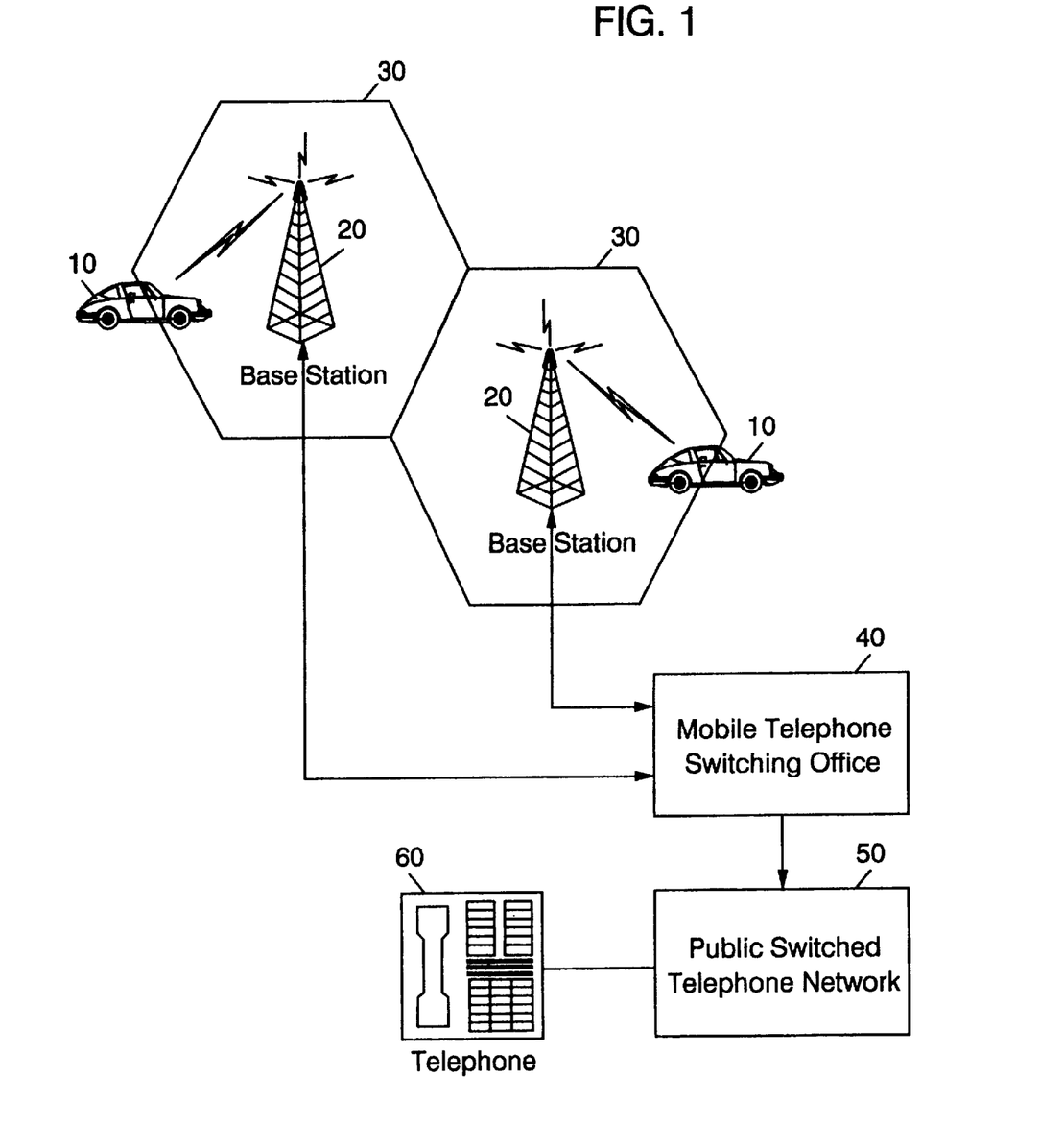
FIG. 1 is a schematic diagram illustrating a conventional cellular communications system.

As illustrated in FIG. 1, a conventional cellular communication system 20 includes one or more mobile terminals 10 which can communicate with one or more base stations 20 serving cells 30. The base stations 20 are connected to a mobile telephone switching office (MTSO) 40, which may in turn be connected to a public switched telephone network 50. Although only two cells 20 are shown in FIG. 1, a typical cellular network may include hundreds of base stations, thousands of mobile terminals and more than one MTSO. Each cell will have allocated to it one or more dedicated control channels and one or more voice channels. Through this cellular infrastructure, a communication link may be effected between two mobile terminals 10, or between a mobile terminal 10 and a landline telephone 60, with a base station 20 typically functioning as a relay station for data and voice information.

Components of a radio communications channel connecting a mobile terminal 10 and a base station 20 which can affect communications between the terminal 10 and the base station 20 include the communications medium, i.e., the atmospheric signal path across which radio communications signals are transmitted, which may introduce fading and interference into the radio communications signals. The fading may include long-term fading due to variations in terrain along the signal propagation path, as well as short-term multipath fading due to reflections from features such as buildings which cause fluctuations in received signal strength and other distortions at a receiving station. Mobile terrestrial radiotelephone communications are particularly susceptible to short-term multipath fading because the signal pathways tend to be close to the ground. Other elements which may have an effect on communications include transmitting and receiving components commonly found in base stations and mobile terminals, such as transmitters, receivers and antennas.

Various signal estimation techniques are conventionally employed to deal with signal degradation on a channel, including diversity reception, signal coding, and specialized demodulation techniques which produce estimates of a channel transfer characteristic. Diversity reception techniques included spatial diversity reception using multiple spaced apart receiving antennas, and polarization diversity reception using multiple antennas designed to accept electromagnetic signals having particular polarizations. As signals from diverse paths typically exhibit uncorrelated fading, they may be combined in the receiver to provide a more accurate estimate of information from a received signal. Signal coding schemes typically employ redundancy to enhance the accuracy of an estimate produced from a received signal, while channel estimation techniques such as pilot tone or symbol assisted modulation and demodulation can provide improved knowledge of a transfer characteristic for the channel to aid in estimating information from a received signal.

Despite the theoretical advantages of these estimation techniques, they may provide less than optimal communication under various propagation conditions encountered in a typical cellular communications system. Diversity reception may not provide sufficient gain because of limitations on antenna size, orientation, and placement, and may be ineffective or unnecessary at particular speeds or other conditions. Coding schemes may entail an undesirable computational burden, while parameters used in estimating the channel may not be optimal for all mobile terminal speeds and under all delay spread conditions.

SUMMARY OF THE INVENTION

In light of the foregoing, it is an object of the present invention to provide communications apparatus and methods which can provide improved signal estimation.

It is another object of the present invention to provide cellular communications apparatus and methods which can provide more optimal signal estimation under differing conditions of delay spread and terminal speed.

These and other objects, features and advantages are provided according to the present invention by communications apparatus and methods in which information is recovered at one entity, e.g., a mobile terminal, from a signal generated in a communications medium by another entity, e.g., a cellular base station, by adaptively estimating the information from the signal based on a mobility characteristic which characterizes communications between the entities. The process can be bidirectional, i.e., adaptive estimation of received signal may be performed at either end of a communications channel. The mobility characteristic may characterize mobility properties of the entities which affect signal propagation between the entities, such as relative speeds of the entities with respect to one another, range between the entities, and the like. According to one embodiment, the mobility characteristic includes a cell type identifier which characterizes mobility of mobile terminals with respect to a base station, e.g., an identifier which identifies a cell served by the base station as a highway macrocell, an urban macrocell, a macrocell or the like, and which bears a correlation to aggregate speed and range properties for terminals typically found within the cell. The cell type identifier may be broadcast to mobile terminals from the base station over, for example, a broadcast control channel, and the mobile terminals can adaptively estimate information from signals received from the base station based on the broadcast cell type identifier. For example, the mobile terminal may store various signal processing elements such as channel estimators, channel interpolation filters, channel trackers, and the like, as well as various parameters for such elements, and may apply these selected elements and parameters to a signal received from a base station based on a cell type identifier received from the station. Accordingly, more optimal signal estimation can be achieved by tailoring signal processing to the mobility characteristic.

In particular, according to the present invention, a communications system for communicating across a communications medium includes a first entity including means for generating a signal in the communications medium, the signal representing information, and a second entity including signal receiving means, responsive to the communications medium, for receiving a signal from the communications medium. The second also includes means for determining a mobility characteristic for communications between the first entity and the second entity, as well as adaptive estimating means, responsive to the signal receiving means, for adaptively estimating the information from the received signal based on the determined mobility characteristic.

According to one aspect of the present invention, the first entity further includes means for transmitting a mobility characteristic, and the means for determining a mobility characteristic includes means for receiving the transmitted mobility characteristic. The adaptive estimating means may include means for adaptively estimating the information based on the received mobility characteristic. The adaptive estimating means may include a number of different adaptive signal processing apparatus, including means for adaptively demodulating the received signal based on the determine mobility characteristic, means for adaptively estimating a characteristic for a channel connecting the first and second entities based on the determined mobility characteristic, means for selecting an interpolation filter based on the determined mobility characteristic, means for adaptively equalizing the received signal based on the determined mobility characteristic, means for adaptively tracking a channel connecting the base station and the mobile terminal based on the determined mobility characteristic, and means for adaptively combining a plurality of received signals based on the determined mobility characteristic.

According to an embodiment of the present invention, a cellular communications system includes a base station, a mobile terminal, and means for communicating a mobility characteristic associated with communications of the base station and the terminal, between the base station and the terminal. A first one of the base station and the mobile terminal may include means for generating a signal in a communications medium, the generated signal representing information. A second one of the base station and the mobile terminal may include signal receiving means, responsive to the communications medium, for receiving the generated signal from the communications medium, and adaptive estimating means, responsive to the signal receiving means, for adaptively estimating the information from the received signal based on the received mobility characteristic. The means for communicating a mobility characteristic may include means for broadcasting a cell type identifier from the base station, for example, over a broadcast control channel. The means for communicating a mobility characteristic may also include means for communicating the mobility characteristic on a channel specific to the mobile terminal, such as an access grant channel or a fast associated control channel.

According to another aspect of the present invention, a communications terminal includes signal receiving means, responsive to a communications medium, for receiving a signal from the communications medium. Means are provided for determining a mobility characteristic associated with the communications medium, and adaptive estimating means are responsive to the signal receiving means and the mobility characteristic determining means, for adaptively estimating information from the received signal based on the determined mobility characteristic. The means for determining a mobility characteristic may include means for receiving a mobility characteristic, and the adaptive estimating means may adaptively estimate the information based on the received mobility characteristic.

According to method aspects of the present invention, information represented by a signal generated in a communications medium by a first entity is recovered by receiving the signal from the communications medium at a second entity, determining a mobility characteristic for communications between the first entity and the second entity, and adaptively estimating the information from the received signal based on the determined mobility characteristic. The mobility characteristic may be received from the first entity at the second entity, and the information represented by the received signal may be adaptively estimated based on the received mobility characteristic. A number of signal processing functions may be adaptively performed, including adaptive demodulation, adaptive channel estimation/interpolation, adaptive equalization, adaptive channel tracking, and adaptive combining of received signals. Improved communications may thereby be achieved.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

For purposes of the discussion herein, "estimation of information" from a signal refers generally to those operations commonly known as "signal estimation" or "signal processing" in which information is extracted from an electromagnetic signal used to represent the information, including, but not limited to, operations such as demodulation, filtering, sampling, equalizing and the like. In addition, "mobility characteristic" as referred to herein includes information relating to spatio-temporal relationships which may impact on communications between entities of a communications system. For example, in a cellular communications system in which mobile terminals communicate with base stations which serve geographical cells, a mobility characteristic may include information relating to spatial-temporal relationships between base stations and mobile terminals, such as speed or range of a specific mobile terminal or typical speed and range characteristics of a population of mobile terminals within a cell with respect to a base station serving the cell. The present invention arises from the realization that due to the effect these mobility characteristics can have on signal properties, e.g., delay spread, more optimal estimation of information from a signal received from a communications medium, e.g., more optimal signal processing, may be achieved by adaptively tailoring signal processing architectures and parameters to varying mobility characteristics.

Figure 2:
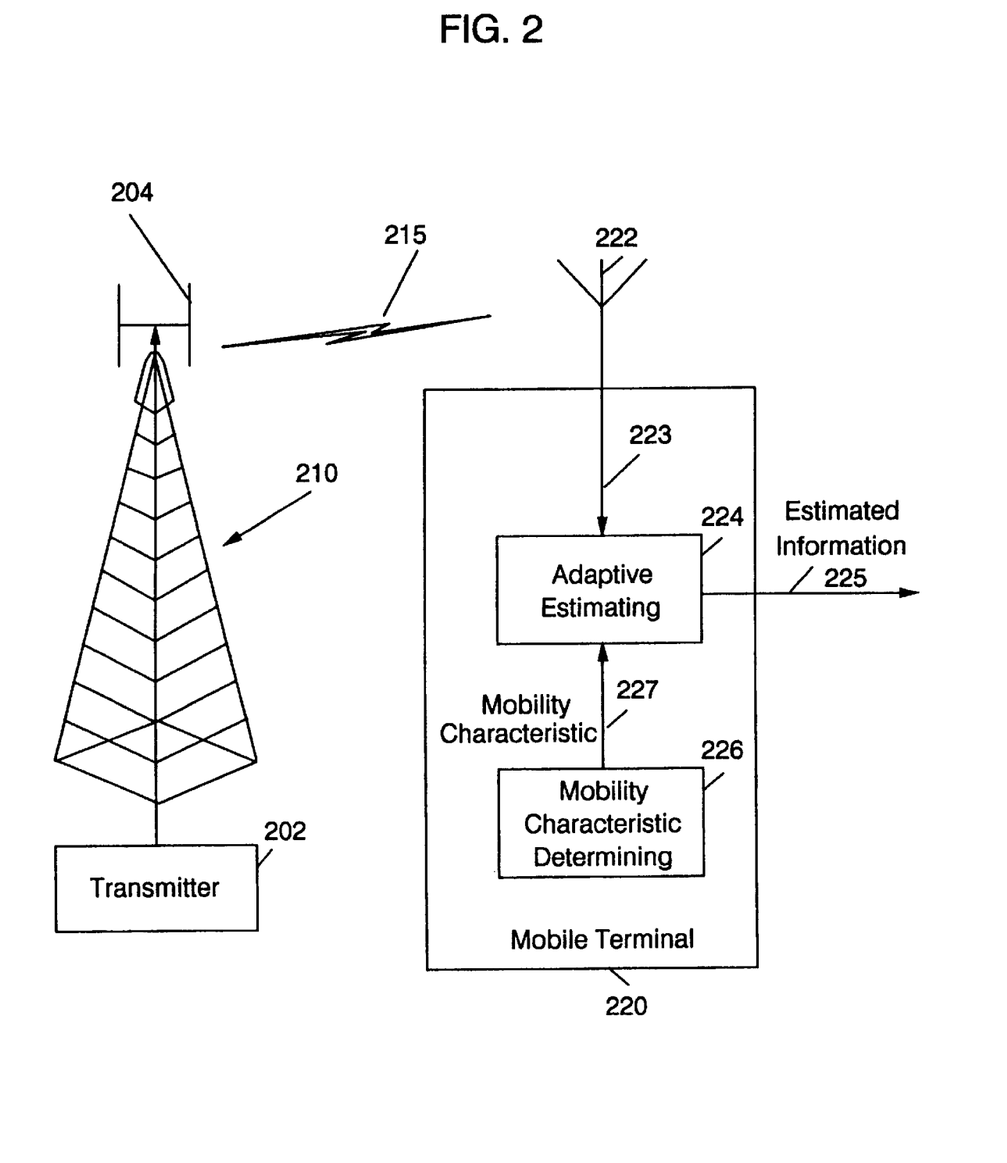
FIGS. 2–3 are schematic diagrams illustrating embodiments of a cellular communications system according to the present invention.
Figure 3:
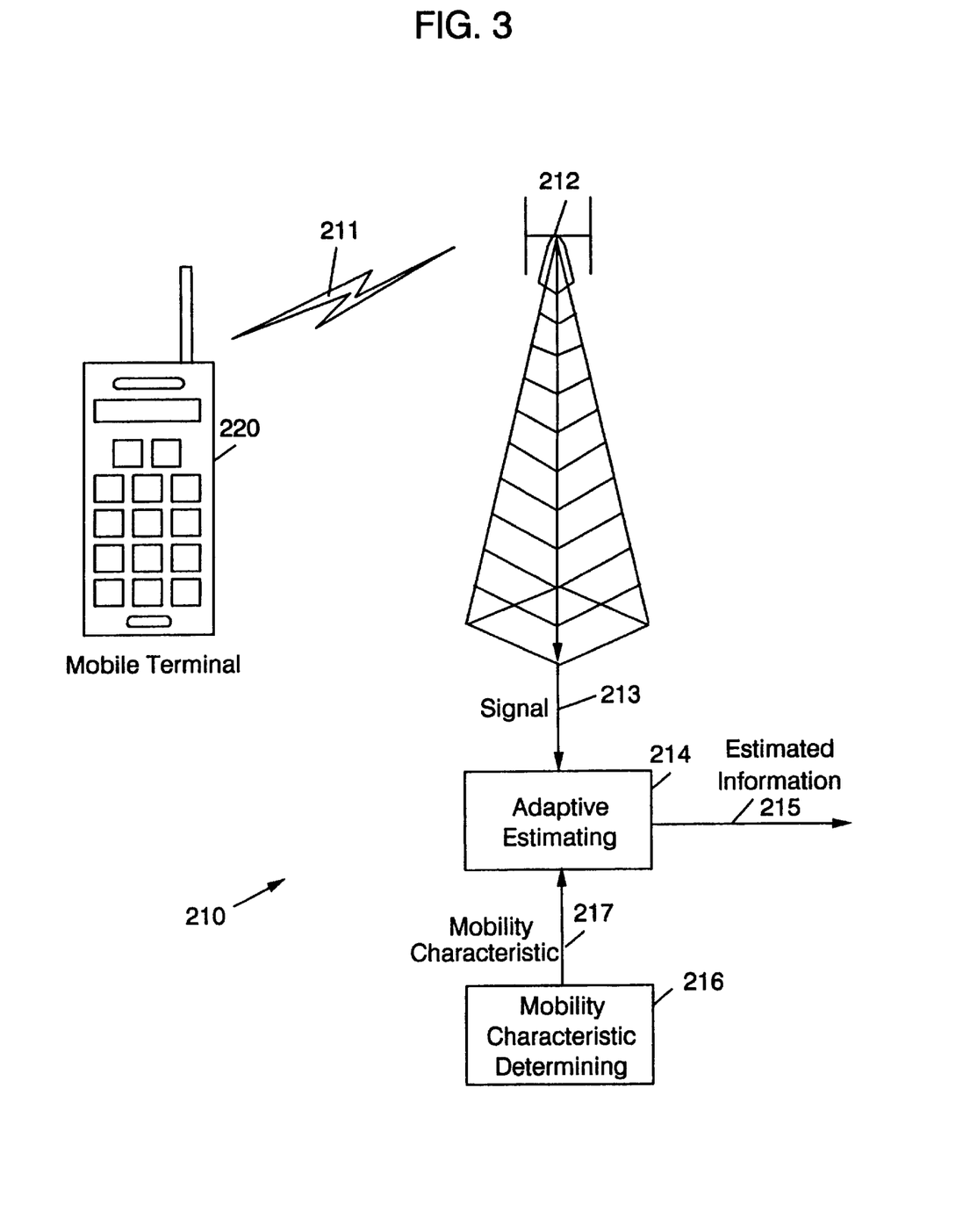

FIG. 2 provides an illustration of a cellular communication system according to the present invention, including a base station 210 which includes means for generating a signal 215 in a communications medium, for example, a transmitter 202 generating a signal through a transmit antenna 204. A mobile terminal 220 includes signal receiving means including, for example, a receive antenna 222, for receiving the generated signal 215. The received signal 223 is processed by adaptive estimating means 224 included in the mobile terminal 220, based on a mobility characteristic 227 determined by mobility characteristic determining means 226. As illustrated in FIG. 3, the roles of the base station 210 and the mobile terminal 220 may be reversed, with the base station 210 including signal receiving means, e.g, a base station antenna 212 and associated hardware, for receiving a signal 211 generated by the mobile terminal 220. Information 215 is adaptively estimated from the received signal 213 by adaptive estimating means 214, based on a mobility characteristic 217 determined by mobility characteristic determining means 216 included in the base station 210.

Those skilled in the art will appreciate that signal generating means of the base station 210 and the mobile terminal 220 may include, for example, commonly used communications components such as signal processors, coders, modulators, mixers, antennas, filters and the like, and may be implemented using special purpose hardware, software running on special or general purpose processors, and combinations thereof. Similarly, the signal receiving means described above may include such components as antennas, cables, waveguides, mixers, filters and the like. The mobility characteristic determining means 216, 226 and the adaptive estimating means 214, 224 described with respect to FIGS. 2–3 may be implemented using special purpose hardware, software running on general purpose processors such as a microprocessor, or combinations thereof. For example, the mobility characteristic determining means 216, 226 may include software running on a microprocessor which determines a mobility characteristic for communications between the base station 210 and the mobile terminal 220, while a digital signal processing (DSP) chip or application specific integrated circuit (ASIC) may be used to implement functions of the adaptive estimating means 214, 224, e.g., various signal processing tasks such as demodulation, channel estimation, and the like.

Figure 4:
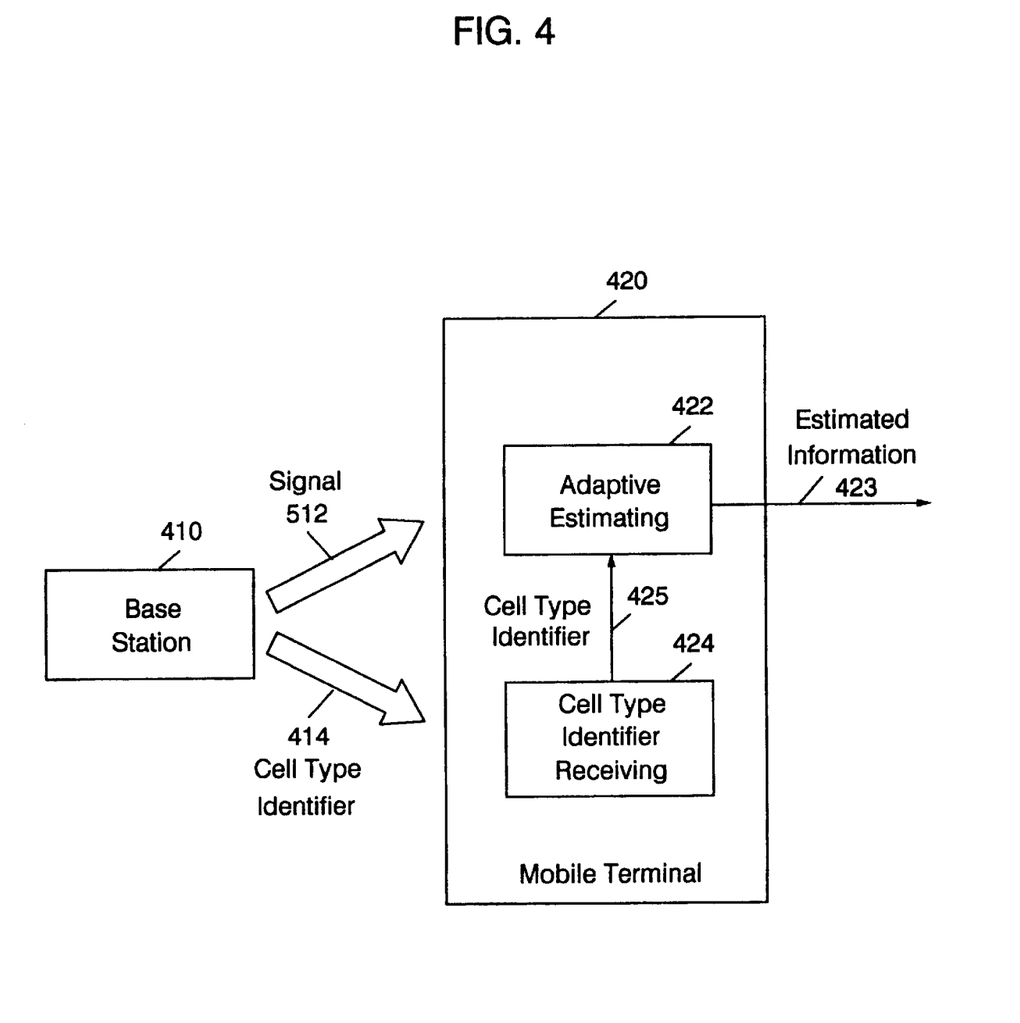
FIGS. 4 is a schematic diagrams illustrating use of cell type identifier in embodiments of a cellular communications system according to the present invention.

According to one embodiment of the invention, the mobility characteristic includes a cell type identifier which is communicated between a base station 410 and a mobile terminal 420, as illustrated in FIG. 4. The cell type identifier may be communicated in a number of ways, included by broadcasting the cell type identifier from the base station 410 over a broadcast control channel 414. The mobile terminal 420 may include means for receiving the broadcast cell type identifier 424, such as receiver circuitry and associated elements which are commonly included in mobile terminals. Adaptive estimating means 422, e.g., demodulating circuitry, signal processing circuitry and the like, are responsive to the cell type identifier receiving means 424 for estimating information from a signal, for example, a signal received over a traffic channel 512, for estimating information from the received signal based on the received cell type identifier 425.

Tables I and II illustrate exemplary relationships mobility and signal characteristics associated with different cell types under the U.S. IS-136 and the European GSM standards, respectively, and desirable signal processing options for these conditions:

TABLE I

Signal Processing Options for IS-136 (and enhanced versions)

| Cell Type | Typical Attributes | Signal processing options |
|---|---|---|
| Highway macrocell | High delay spread | Apply equalization |
| | High terminal speed | High speed channel tracking and channel interpolation |
| | High/Medium terminal speed | Disable diversity reception |
| Urban macrocell | Low delay spread | Differential detection or low-order equalizer (1 tap) |
| | Medium terminal speed | Medium speed channel tracking and channel interpolation |
| Microcell | Low delay spread | Differential detection or low order equalizer (1 tap) |
| | Low terminal speed | Low speed channel tracking and channel interpolation, enable diversity reception |
| Picocell | Low delay spread | Differential detection or low order equalizer |
| | Low speed | Low speed channel tracking and channel interpolation, enable diversity reception |

TABLE II

Signal Processing Options for GSM

| Cell Type | Typical Attributes | Signal processing options |
|---|---|---|
| Highway macrocell | High delay spread | High order equalizer |
| | High terminal speed | Enable channel tracking |
| Urban macrocell | Low/Medium delay spread | Medium order equalizer (4 taps) |
| | Medium terminal speed | Disable channel tracking |
| Microcell | Low/medium delay spread | Low/medium order equalizer (3-4 taps) |
| | Low terminal speed | Disable channel tracking |
| Picocell | Low delay spread | Low order equalizer (3 taps) |
| | Low speed | Disable channel tracking Low speed channel interpolation |

Those skilled in the art will appreciate that other types of mobility characteristics and techniques for determining mobility characteristics for adaptive signal processing fall within the scope of the present invention. For example, instead of an indirect measurement of mobility which provides mobility information on a typical population of mobile terminals with respect to a base station, mobile-specific information such as the range and speed of a particular terminal may be determined. This information may also be communicated on a mobile-specific basis, instead of by broadcasting to a population of terminals on a common control channel. For example, a base station may compute range and speed for a terminal and transmit the computed information to the terminal on an access grant channel or fast associated control channel, and the mobile terminal may use this information to adaptively select from a "bank" of algorithms and/or algorithm parameters to optimally adapt its processing of signals received from the base station. In another implementation, a mobile terminal may include means for determining speed and range with respect to a particular base station with which it is communicating, and may use this information to adjust its signal processing. A base station could also perform similar computations to adjust its own signal processing.

Figure 5:
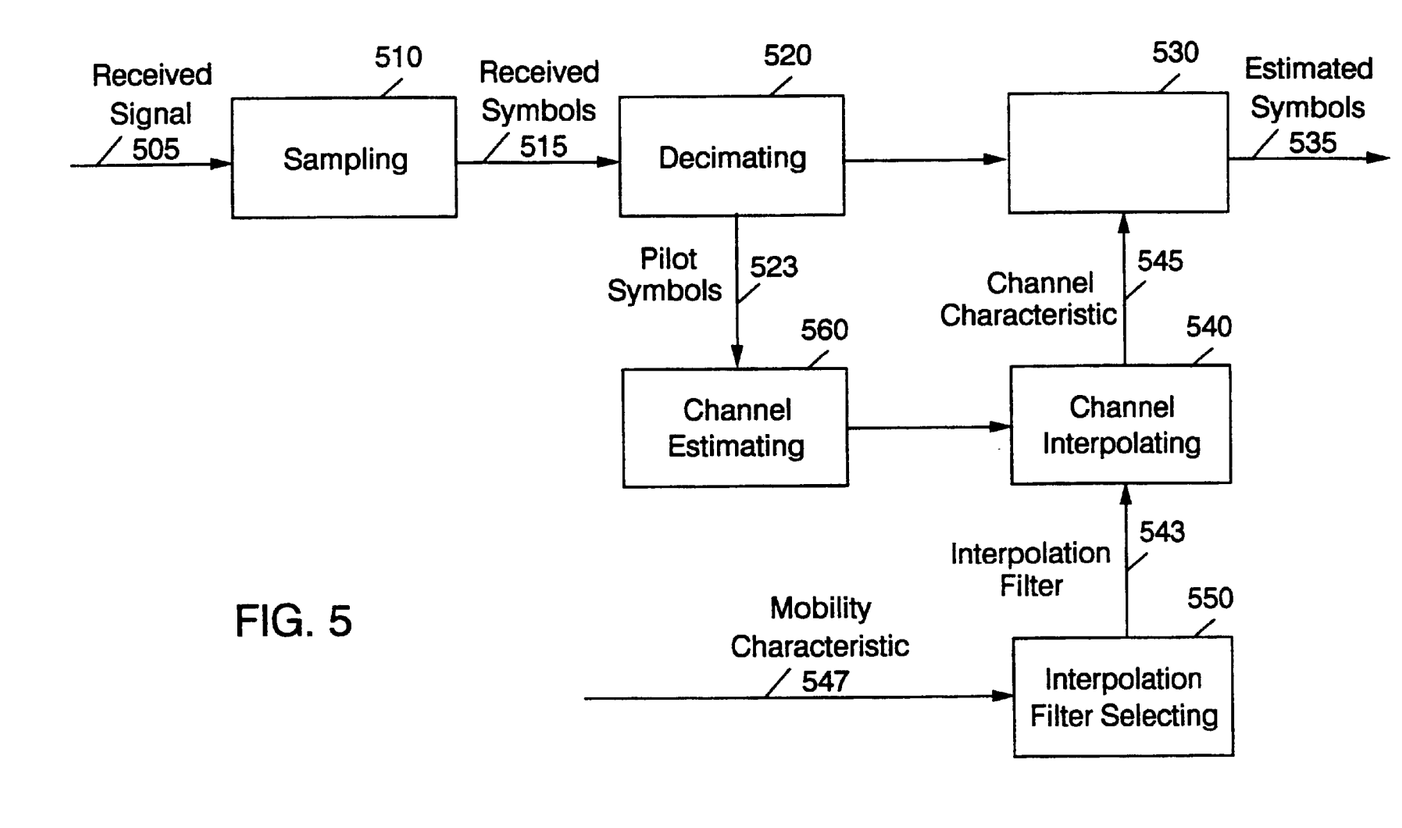
FIG. 5 is a schematic diagram illustrating adaptive channel estimation according to the present invention.

An aspect of adaptive signal estimation according to the present invention is illustrated in FIG. 5. In FIG. 5, an estimate 535 of symbols represented by a received signal 505 is produced in an adaptive fashion using a pilot-symbol assisted technique. Sampling means 510 produces a sequence of received symbols 515. Pilot symbols 523 are extracted from the sequence 515 by decimating means 520, and are passed to channel estimating means 560 and the channel interpolating means 540. The channel interpolating means 540 interpolate a channel characteristic 545 for a channel over which the received signal 505 is received, e.g., a communications channel which connects a base station and a mobile terminal, using a channel interpolation filter 543 selected by interpolation filter selecting means 550 according to a mobility characteristic 547. Symbol estimating means 530 estimate the original symbol sequence represented by the received signal 505, using the interpolated channel characteristic 545.

Those skilled in the art will appreciate that the means of FIG. 5 may be implemented using a variety of commonly-used communications components, including special purpose hardware, software or firmware running on a data processing apparatus or combinations thereof For example, sampling means 510 may include analog-to-digital converters (A/Ds), associated filters, and the like. The functions of interpolation filter selecting means 550 may, for example, be performed by a control microprocessor or similar apparatus, while the functions of decimating means 520, channel interpolating means 540 and symbol estimating means 530 may be performed by a DSP, ASIC or the like. The operations of these components is well-known to those skilled in the art, and will not be discussed in detail herein.

Figure 6:
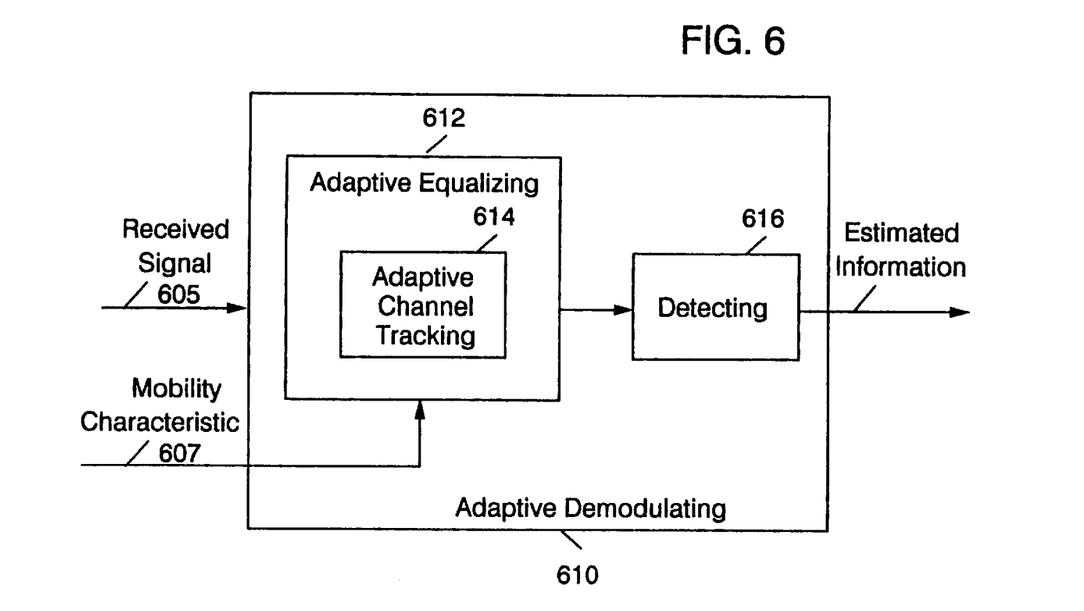
FIG. 6 is a schematic diagram illustrating adaptive demodulation according to the present invention.
Figure 7:
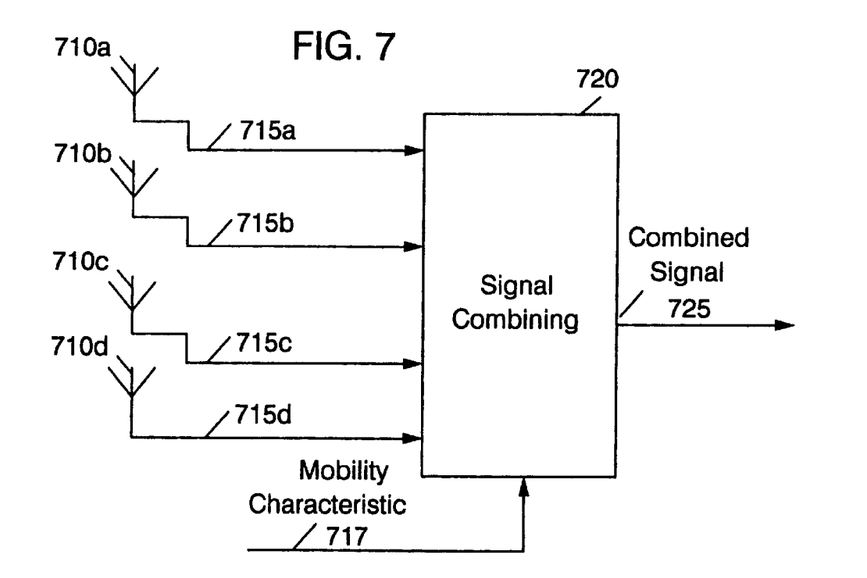
FIG. 7 is a schematic diagram illustrating adaptive signal combining according to the present invention.

Other adaptive signal processing aspects are illustrated in FIGS. 6 and 7. In FIG. 6, a received signal 605 is adaptively demodulated according to a mobility characteristic 607. Demodulating means 610 may include adaptive equalizing means 612 which equalizes the received signal 605 according to the mobility characteristic 607 for subsequent detection in detecting means 616. The embodiment illustrated in FIG. 6 includes equalizing means 612, which includes adaptive channel tracking means 614 which tracks a channel over which the signal 605 is received, based on the mobility characteristic 607.

In FIG. 7, a plurality of signals 715a–d are received from a plurality of signal paths, for example, using a plurality of spatially diverse antennas 710a–d. Signal combining means 720 combines the plurality of signals 715a–d according to a mobility characteristic 717, producing a combined signal 725. Those skilled in the art will appreciate that under certain mobility characteristics, diversity combination of signals may be unnecessary, and that combining of diversely received signals may consist of selecting a single one of the signals for processing, for example, a signal having the highest signal strength.

Those skilled in the art will appreciate that the means described with respect to FIGS. 6 and 7 may implemented using various commonly-used communications components, including special purpose hardware, software or firmware running on a general purpose data processing apparatus, or combinations thereof. For example, the functions of the adaptive demodulating means 610 and the signal combining means 720 may be performed by a DSP, ASIC or similar circuits.

Figure 8:
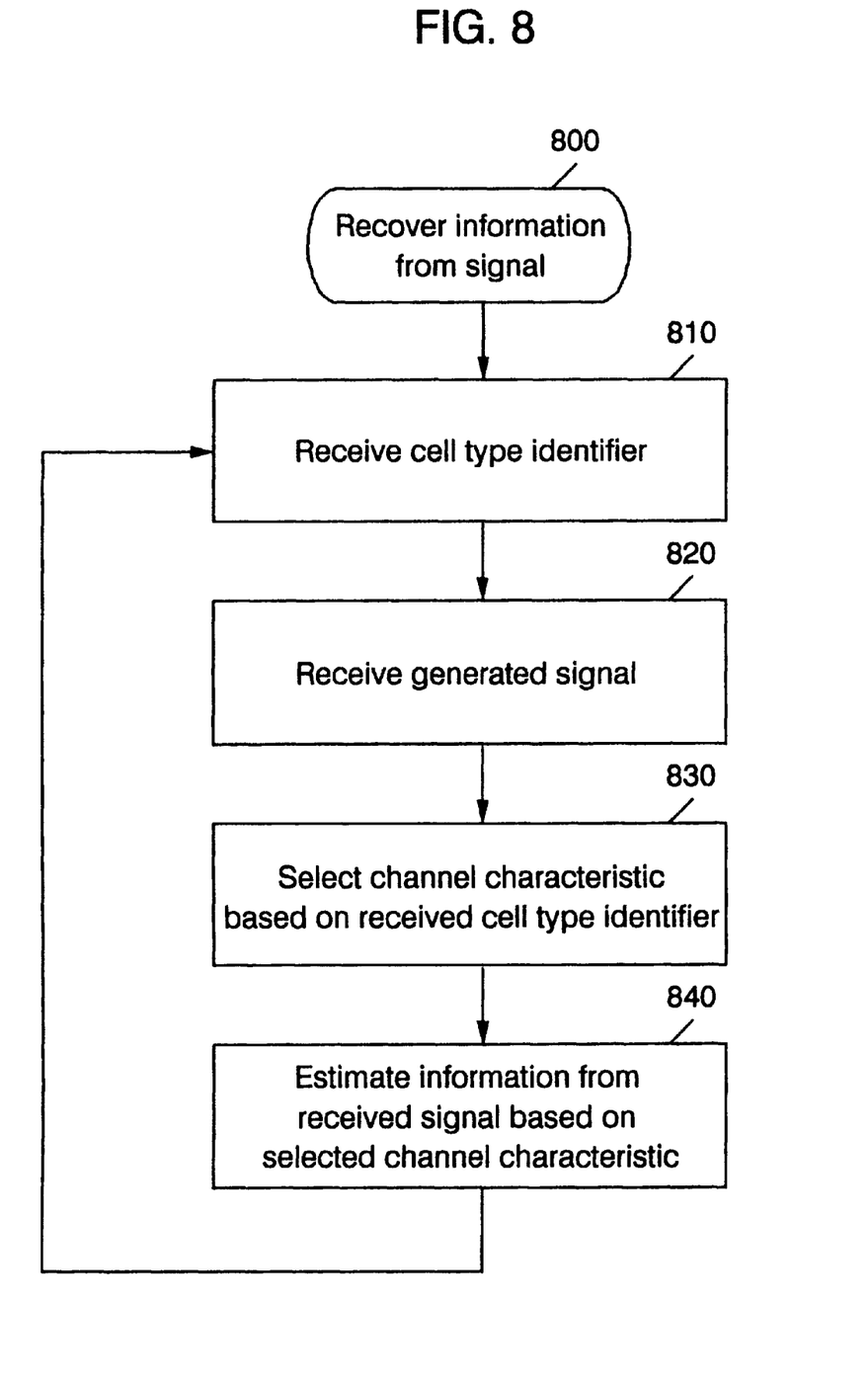
FIG. 8 is a flowchart illustration of operations for recovering information from a signal according to the present invention.

Exemplary operations for recovering information from a signal generated in a communications medium according to the present invention are illustrated in FIG. 8 (Block 800). To recover information from a signal generated in a communications medium, for example, a signal generated by a base station of a cellular communications system, a mobility characteristic is determined, e.g., a cell type identifier is received from the base station (Block 810). A signal generated by the based station is received (Block 820), and information represented by the signal is adaptively estimated according to the received mobility characteristic. For example, a channel characteristic may be selected for the channel over which the signal is received based on the received cell type identifier (Block 830), and information may be estimated from the received signal based on the selected channel characteristic (Block 840). Those skilled in the art will appreciate that numerous variations on the above-described operations also fall within the scope of the present invention, including variations on the type of mobility characteristic employed, the manner in which the mobility characteristic is determined, and the type of adaptive signal estimation performed. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A communications system, comprising:
   a first entity including means for transmitting a mobility characteristic that characterizes mobility of a second entity with respect to the first entity and means for generating a signal in a communications medium, the signal generated by the first entity representing information; and
   a second entity including:
   signal receiving means, responsive to the communications medium, for receiving the signal generated by the first entity from the communications medium;
   means for receiving the transmitted mobility characteristic; and
   adaptive estimating means, responsive to said signal receiving means and to said means for determining a mobility characteristic, for estimating the information from the received signal generated by the first entity, wherein said adaptive estimating means adaptively processes the received signal generated by the first entity based on the received mobility characteristic.

2. A system according to claim 1, wherein a first one of the first and second entities comprises a cellular base station, and wherein said mobility characteristic characterizes mobility with respect to the cellular base station.

3. A system according to claim 2, wherein the base station serves a cell, and wherein said mobility characteristic characterizes mobility of mobile terminals which typically are present in said cell.

4. A system according to claim 3, wherein said mobility characteristic comprises a cell type identifier.

5. A system according to claim 2, wherein a second one of the first and second entities comprises a mobile terminal, and wherein said mobility characteristic characterizes mobility of said mobile terminal with respect to said cellular base station.

6. A system according to claim 1, wherein said adaptive estimating means comprises means for adaptively demodulating the received signal generated by the first entity based on the received mobility characteristic.

7. A system according to claim 1, wherein said adaptive estimating means comprises:
   means for adaptively estimating a characteristic for a channel connecting the first and second entities based on the received mobility characteristic; and
   means for adaptively processing the received signal generated by the first entity based on the estimated channel characteristic.

8. A system according to claim 1, wherein said adaptive estimating means comprises means for adaptively equalizing the received signal generated by the first entity based on the received mobility characteristic.

9. A system according to claim 8, wherein said means for adaptively equalizing comprises means for adaptively tracking a channel connecting the base station and the mobile terminal based on the received mobility characteristic.

10. A system according to claim 1:
    wherein said signal receiving means comprises means for receiving a plurality of signals generated by the first entity over a plurality of signal paths; and
    wherein said adaptive estimating means comprises means for adaptively combining the plurality of signals generated by the first entity based on the received mobility characteristic.

11. A communications system, comprising:
    a first entity including means for generating a signal in a communications medium, the signal generated by the first entity representing information including a symbol sequence including a pilot symbol; and
    a second entity including:
       signal receiving means, responsive to the communications medium, for receiving the signal generated by the first entity from the communications medium;
    means for receiving a mobility characteristic that characterizes mobility of the second entity with respect to the first entity; and
    adaptive estimating means, responsive to said signal receiving means and to said means for determining a mobility characteristic, for estimating the information from the received signal generated by the first entity, wherein said adaptive estimating means adaptively processes the received signal generated by the first entity based on the determined mobility characteristic, wherein said adaptive estimating means comprises:
       means, responsive to said signal receiving means, for detecting a pilot symbol from the received signal generated by the first entity;
       means, responsive to said means for determining a mobility characteristic, for selecting an interpolation filter based on the determined mobility characteristic;

means, responsive to said means for detecting a pilot symbol and to said means for selecting an interpolation filter, for interpolating a characteristic for the channel from the detected pilot symbol according to the selected interpolation filter; and
    means, responsive to said means for interpolating a channel characteristic, for estimating the symbol sequence from the received signal generated by the first entity based on the interpolated channel characteristic.

12. A cellular communications system, comprising:
    a base station;
    a mobile terminal; and
    means for communicating a mobility characteristic that characterizes mobility of said terminal with respect to said base station, between said base station and said terminal,
    wherein a first one of said base station and said mobile terminal includes means for generating a signal in a communications medium, the generated signal representing information; and
    wherein a second one of said base station and said mobile terminal includes:
       signal receiving means, responsive to the communications medium, for receiving the signal generated by the first one of said base station and said mobile terminal from the communications medium; and
       adaptive estimating means, responsive to said signal receiving means and to said means for communicating a mobility characteristic, for estimating the information from the received signal generated by the first one of said base station and said mobile terminal, wherein said adaptive estimating means adaptively processes the received signal generated by the first one of said base station and said mobile terminal based on the communicated mobility characteristic.

13. A system according to claim 12, wherein said base station serves a cell, and wherein said means for communicating a mobility characteristic comprises means for broadcasting a cell type identifier from said base station.

14. A system according to claim 13, wherein said means for broadcasting comprises means for broadcasting the cell type identifier on a broadcast control channel.

15. A system according to claim 12, wherein said means for communicating a mobility characteristic comprises means for communicating the mobility characteristic on a channel specific to the mobile terminal.

16. A system according to claim 15, wherein said means for communicating transmitting a mobility characteristic comprises means for communicating the mobility characteristic on an access grant channel.

17. A system according to claim 15, wherein said means for communicating a mobility characteristic comprises means for communicating the mobility characteristic on a fast associated control channel.

18. A system according to claim 12, wherein said adaptive estimating means comprises means for adaptively demodulating the received signal generated by the first one of said base station and said mobile terminal based on the communicated mobility characteristic.

19. A system according to claim 12, wherein said adaptive estimating means comprises:
    means for adaptively estimating a characteristic for a channel connecting the base station and the mobile terminal based on the received mobility characteristic; and means, responsive to said means for adaptively estimating a channel characteristic, for adaptively processing the received signal generated by the first one of said base station and said mobile terminal based on the estimated channel characteristic.

20. A system according to claim 19, wherein the information includes a symbol sequence including a pilot symbol, and wherein adaptive estimating means comprises:

means, responsive to said signal receiving means, for detecting a pilot symbol from the received signal generated by the first one of said base station and said mobile terminal;

means, responsive to said means for communicating a mobility characteristic, for selecting an interpolation filter based on the communicated mobility characteristic;

means, responsive to said means for selecting an interpolation filter, for interpolating a characteristic for the channel from the detected pilot symbol according to the selected interpolation filter; and means, responsive to said means for interpolating a channel characteristic, for estimating the symbol sequence from the received signal generated by the first one of said base station and said mobile terminal based on the interpolated channel characteristic.

21. A system according to claim 12, wherein said adaptive estimating means comprises means for adaptively equalizing the received signal generated by the first one of said base station and said mobile terminal based on the communicated mobility characteristic.

22. A system according to claim 21, wherein said means for adaptively equalizing comprises means for adaptively tracking a channel connecting the base station and the mobile terminal based on the communicated mobility characteristic.

23. A system according to claim 12:

wherein said signal receiving means comprises means for receiving a plurality of signals generated by the first one of said base station and said mobile terminal over a plurality of signal paths; and wherein said adaptive estimating means comprises means for adaptively combining the received plurality of signals generated by the first one of said base station and said mobile terminal based on the communicated mobility characteristic.

24. A communications terminal, comprising:

signal receiving means, responsive to a communications medium, for receiving a signal generated by a source station from the communications medium;

means for determining a mobility characteristic that characterizes mobility of the terminal with respect to said source station; and adaptive estimating means, responsive to said signal receiving means, for estimating information from the received signal generated by the source station, wherein said adaptive estimating means adaptively processes the received signal generated by the source station based on the determined mobility characteristic, wherein said adaptive estimating means comprises:

means, responsive to said signal receiving means, for detecting a pilot symbol from the received signal generated by the source station;

means, responsive to said means for determining a mobility characteristic, for selecting an interpolation filter based on the determined mobility characteristic;

means, responsive to said means for detecting a pilot symbol and to said means for selecting and interpolation filter, for interpolating a characteristic for the channel from the detected pilot symbol and the selected interpolation filter; and means, responsive to said means for interpolating a channel characteristic, for estimating a symbol sequence from the received signal generated by the source station based on the interpolated channel characteristic.

25. A method of recovering information represented by a signal generated in a communications medium by a first entity, the signal representing information including a symbol sequence including a pilot symbol, the method comprising the steps of:

receiving the signal generated by the first entity from the communications medium at a second entity;

determining a mobility characteristic that characterizes mobility of the second entity with respect to the first entity; and adaptively processing the received signal generated by the first entity based on the determined mobility characteristic to estimate the information, wherein said step of adaptively processing comprises the steps of:

detecting a pilot symbol from the received signal generated by the first entity;

selecting an interpolation filter based on the determined mobility characteristic;

interpolating a characteristic for the channel from the detected pilot symbol according to the selected interpolation filter; and estimating the symbol sequence from the received signal generated by the first entity based on the interpolated channel characteristic.

26. A method of communicating information between a mobile terminal and a base station which serves a cell of a cellular communications system, the method comprising the steps of:

communicating a mobility characteristic that characterizes mobility of the mobile terminal with respect to the base station between the base station and the mobile terminal;

generating a signal in a communications medium from a first one of the base station and the mobile terminal, the signal generated by the first one of the base station and the mobile terminal representing information;

receiving the signal generated by the first one of the base station and the mobile terminal from the communications medium at a second one of the base station and the mobile terminal; and adaptively processing the received signal generated by the first one of the base station and the mobile terminal based on the communicated mobility characteristic to generate an estimate of the information.

27. A method according to claim 26, wherein said step of communicating a mobility characteristic comprises the step of broadcasting a cell type identifier from the base station.

28. A method according to claim 27, wherein said step of broadcasting comprises the step of communicating the mobility characteristic on a broadcast control channel.

29. A method according to claim 26, wherein said step of communicating a mobility characteristic comprises the step of communicating the mobility characteristic on a channel assigned to one mobile terminal.

30. A method according to claim 29, wherein said step of communicating the mobility characteristic comprises the step of communicating the mobility characteristic on an access grant channel.

31. A method according to claim 29, wherein said step of communicating the mobility characteristic comprises the step of communicating the mobility characteristic on a fast associated control channel.

32. A method according to claim 26, wherein said step of adaptively processing comprises the step of adaptively demodulating the received signal generated by the first one of the base station and the mobile terminal based on the communicated mobility characteristic.

33. A method according to claim 26, wherein said step of adaptively processing comprises the steps of:

adaptively estimating a characteristic for a channel connecting the base station and the mobile terminal based on the communicated mobility characteristic; and processing the received signal generated by the first one of the base station and the mobile terminal based on the estimated channel characteristic.

34. A method according to claim 33, wherein the information includes a symbol sequence including a pilot symbol, and wherein said step of adaptively processing comprises the steps of:

detecting a pilot symbol from the received signal generated by the first one of the base station and the mobile terminal;

selecting an interpolation filter based on the communicated mobility characteristic;

interpolating a characteristic for the channel from the detected pilot symbol according to the selected interpolation filter; and estimating the symbol sequence from the received signal generated by the first one of the base station and the mobile terminal based on the interpolated channel characteristic.

35. A method according to claim 26, wherein said step of adaptively processing comprises the step of adaptively equalizing the received signal generated by the first one of the base station and the mobile terminal based on the communicated mobility characteristic.

36. A method according to claim 35, wherein said step of adaptively equalizing comprises the step of adaptively tracking a channel connecting the base station and the mobile terminal based on the communicated mobility characteristic.

37. A method according to claim 26:

wherein said step of receiving a signal comprises the step of receiving a plurality of signals generated by the first one of the base station and the mobile terminal over a plurality of signal paths; and wherein said step of adaptively processing comprises the step of adaptively combining the plurality of signals generated by the first one of the base station and the mobile terminal based on the communicated mobility characteristic.

* * * * *